United States Patent
Blazvick

(10) Patent No.: US 10,948,197 B2
(45) Date of Patent: Mar. 16, 2021

(54) OVEN BROILER DRAWER

(71) Applicant: CHAR Products LLC, North Las Vegas, NV (US)

(72) Inventor: William P. Blazvick, Las Vegas, NV (US)

(73) Assignee: CHAR Products LLC, North Las Vegas, NV (US)

( * ) Notice: Subject to any disclaimer, the term of this patent is extended or adjusted under 35 U.S.C. 154(b) by 122 days.

(21) Appl. No.: 16/266,283

(22) Filed: Feb. 4, 2019

(65) Prior Publication Data
US 2019/0242589 A1 Aug. 8, 2019

Related U.S. Application Data

(60) Provisional application No. 62/626,819, filed on Feb. 6, 2018.

(51) Int. Cl.
*F24C 15/16* (2006.01)

(52) U.S. Cl.
CPC .................. *F24C 15/16* (2013.01)

(58) Field of Classification Search
CPC ..................................................... F24C 15/16
USPC ............................................. 126/41 D, 19 R
See application file for complete search history.

(56) References Cited

U.S. PATENT DOCUMENTS

| | | | | |
|---|---|---|---|---|
| 2,113,544 A * | 4/1938 | Haley | F24C 15/16 | 312/400 |
| 2,193,055 A * | 3/1940 | Brumbaugh | F24C 3/087 | 126/39 E |
| 2,255,129 A * | 9/1941 | Rogers | F24C 15/162 | 126/340 |
| 2,868,190 A * | 1/1959 | Reeves | A47J 37/04 | 126/41 E |
| 3,638,634 A * | 2/1972 | Bolitho | A47J 37/0682 | 126/41 R |
| 5,605,143 A * | 2/1997 | Hebert | A21B 3/16 | 126/41 R |
| 6,371,011 B1 * | 4/2002 | Kuechler | A47J 37/0682 | 126/51 |
| 2004/0177842 A1 * | 9/2004 | Larsen | F24C 3/087 | 126/41 R |
| 2005/0205081 A1 * | 9/2005 | Barker, Jr. | F24C 15/162 | 126/190 |

* cited by examiner

*Primary Examiner* — Avinash A Savani
(74) *Attorney, Agent, or Firm* — Burch & Cracchiolo, P.A.

(57) ABSTRACT

Charbroiler drawer assembly having a housing and drawer, slide and gas manifold assemblies. The slide assembly has slide brackets mounted to the interior sides of the housing configured to receive caster assemblies mounted to the exterior sides of the drawer. The drawer, having an open bottom and a cooking surface on the top, has sides shaped to fit within and be received by the housing. The gas manifold assembly is cantilevered from the housing back and positioned within the drawer and the housing so as to permit free movement of the drawer and the caster assembly when the caster assembly engages with the slide brackets.

14 Claims, 19 Drawing Sheets

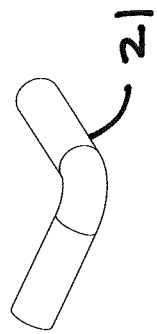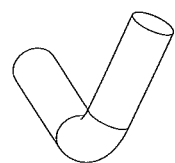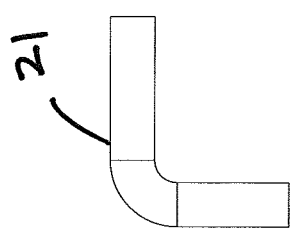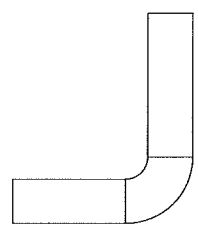
FIG. 7

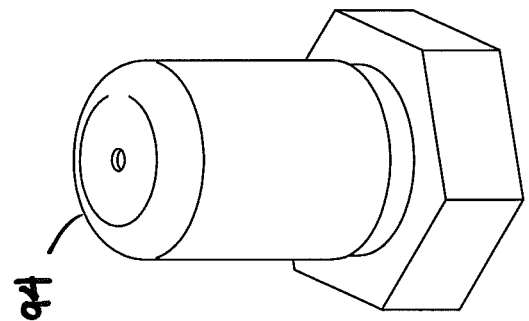
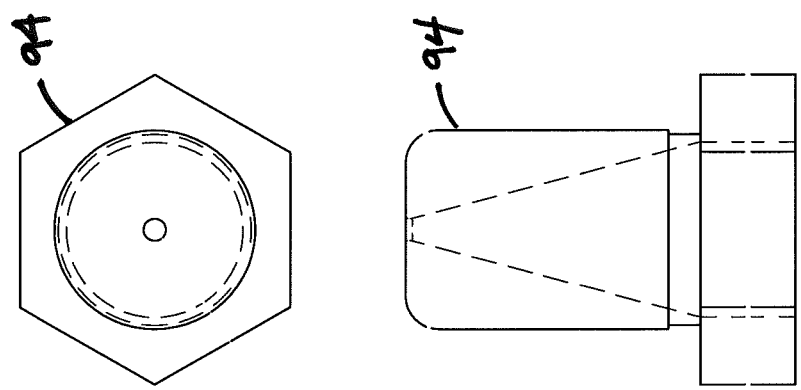
FIG. 19

OVEN BROILER DRAWER

FIELD OF THE INVENTION

This invention relates to charbroilers in general and more specifically to a broiler drawer for placement in a masonry or ceramic oven.

BACKGROUND OF THE INVENTION

With a growing trend toward open kitchens, more and more restaurants are incorporating brick, stone or ceramic wood-fired or gas-fired pizza ovens in their kitchens, along with a host of other specialized professional cooking equipment, such as charbroilers. Pizza ovens (which can be used for foods other than pizza) operate at extremely high temperatures in the range of around 700° (371.1° C.) to around 1,000° (537.8° C.). Charbroilers are standalone range or countertop models; sometimes a lower oven may be incorporated with the range models.

BRIEF SUMMARY OF THE INVENTION

A charbroiler drawer according to one embodiment of the present invention may include a housing, a drawer assembly, a slide assembly and a gas manifold assembly. The housing includes a bottom, two sides and a back, in which the sides may be in spaced parallel relation to one another and perpendicular to the bottom, and the back may be attached to the bottom and the sides in perpendicular fashion. The drawer assembly, which does not have a bottom, includes a cooking surface and two sides in spaced parallel relation linked by a back member defining a substantially open portion; the sides may be shaped to be received by the housing and to support the cooking surface on top. The slide assembly includes two slide brackets and a caster assembly comprising a plurality of casters attached to a caster support member. Each slide bracket has an upper track and a lower track configured to receive at least one caster assembly. Each slide bracket may be attached to an interior of one housing side and each caster assembly may be attached to an exterior of each drawer side, configured so that the drawer assembly slides out of the housing when the caster assembly is engaged. The gas manifold includes a support beam, a gas supply pipe and a burner assembly. The support beam may be attached in cantilever fashion to the housing back and holds the gas supply pipe within in it. The gas supply pipe may extend through the housing back and be operatively associated with the burner assembly. The gas manifold assembly may be positioned to allow free movement of the drawer assembly and caster assembly when the caster assembly is engaged.

BRIEF DESCRIPTION OF THE DRAWINGS

Illustrative and presently preferred exemplary embodiments of the invention are shown in the drawings in which:

FIG. 7 shows several views of a handle base of the present invention;

FIG. 19 contains multiple views of a burner orifice of an embodiment of the present invention.

DETAILED DESCRIPTION OF THE INVENTION

Figure 1:
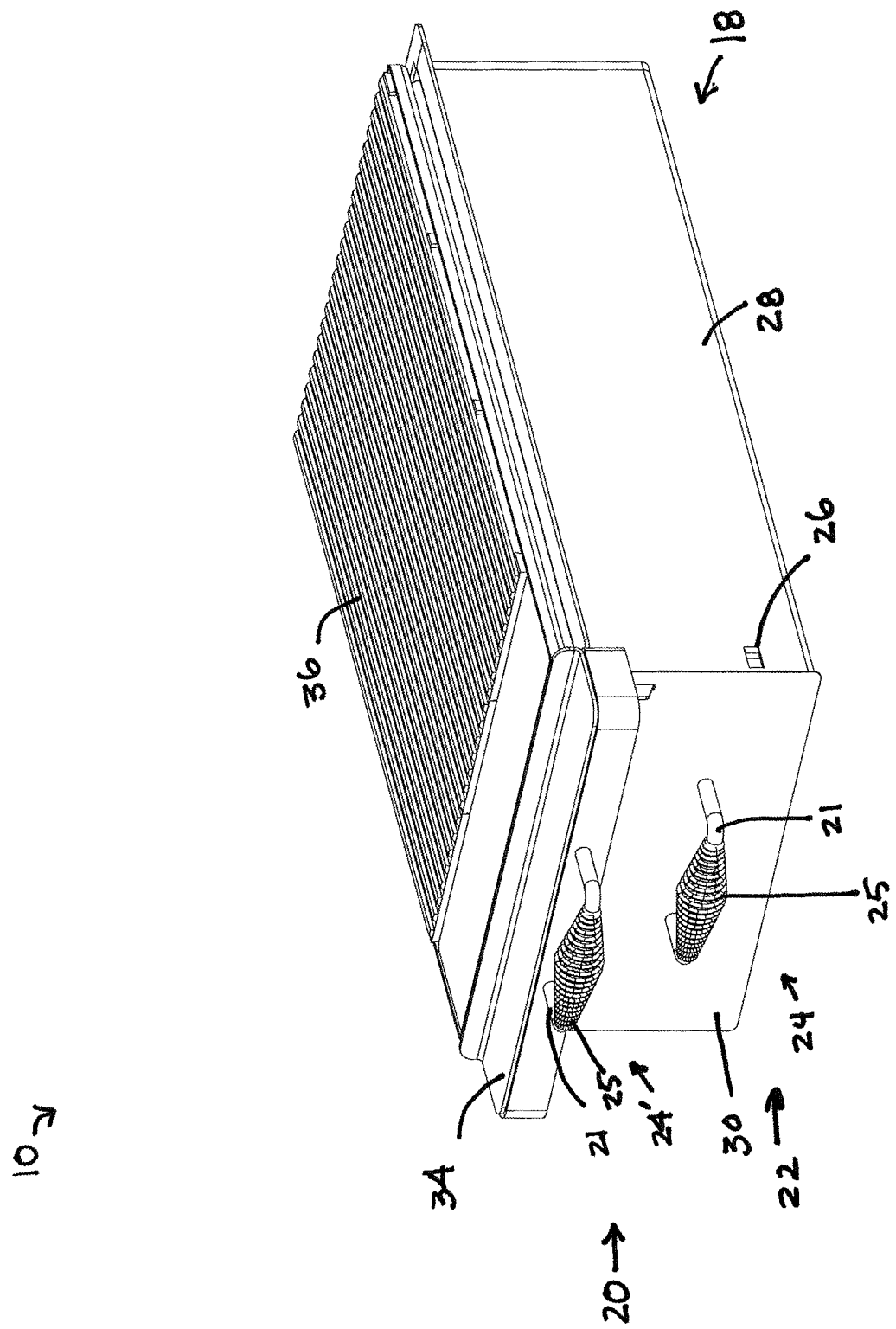
FIG. 1 is an isometric view of the oven broiler drawer of the present invention.

The present invention comprises a charbroiler drawer or oven broiler drawer 10 connected to a source of natural gas (although other gas sources, such as propane of liquified petroleum gas (LPG), could be used).

Oven broiler drawer 10 solves several problems identified by the inventor for extending various drawers, racks or shelves of a charbroiler. They include heat, weight and limited extension. Charbroilers may have only a metal on metal slide for a grease or crumb tray located below the burners, but not a slide assembly for moving the cooking surface. Slide assemblies are more commonly found in conventional ovens; however, such slide assemblies are often limited in their design because the heat source for cooking is right next to the slide assemblies which can cause deterioration. In addition, prior slide assemblies may not be able to support the weight of the cast-iron and steel components required for high temperature cooking of a charbroiler or oven broiler drawer 10. Finally, known slide assemblies are not capable of being fully extended or are limited to over travel for exhaust hood capture, which can lead to health hazards and injuries while cooking. Moreover, there is no known charbroiler for incorporation into a masonry or brick pizza oven. The present oven broiler drawer 10 solves these problems identified by the inventor.

The present invention will now be described with reference to the drawings. Oven broiler drawer 10 comprises drawer assembly 12, housing 18, slide assembly 14 and gas manifold assembly 16. In embodiments shown, housing 18 provides a support base for oven broiler drawer 10. Drawer assembly 12 is inserted into housing 18 in a nesting cooperative arrangement so that drawer assembly 12 can be extended in various embodiments via slide assembly 14 without disturbing gas manifold assembly 16 even during active grilling operations.

As shown in FIGS. 1-2, 3 and 6, drawer assembly 12 comprises upper drawer 20 and lower drawer 22, both of which fit within housing 18 in a nesting cooperative arrangement in which, among other things, upper drawer 20 supports a cooking or grilling surface (e.g., grate 36), while lower drawer 22 allows for the collection of grease and crumbs from food being grilled.

Figure 3:
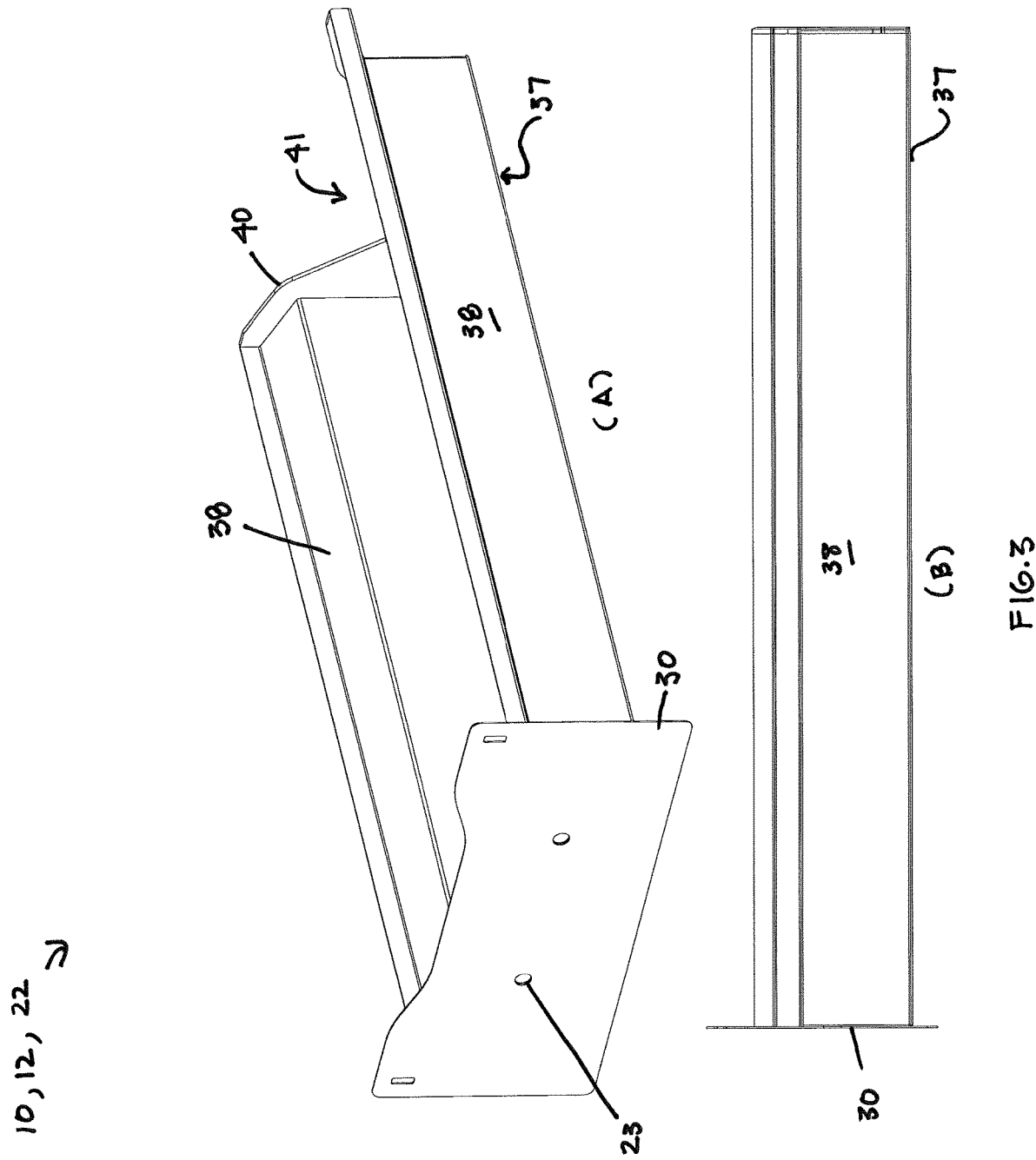
FIG. 3 is an (A) isometric view and (B) a side cross-section of a lower drawer of an embodiment of the present invention.
Figure 8:
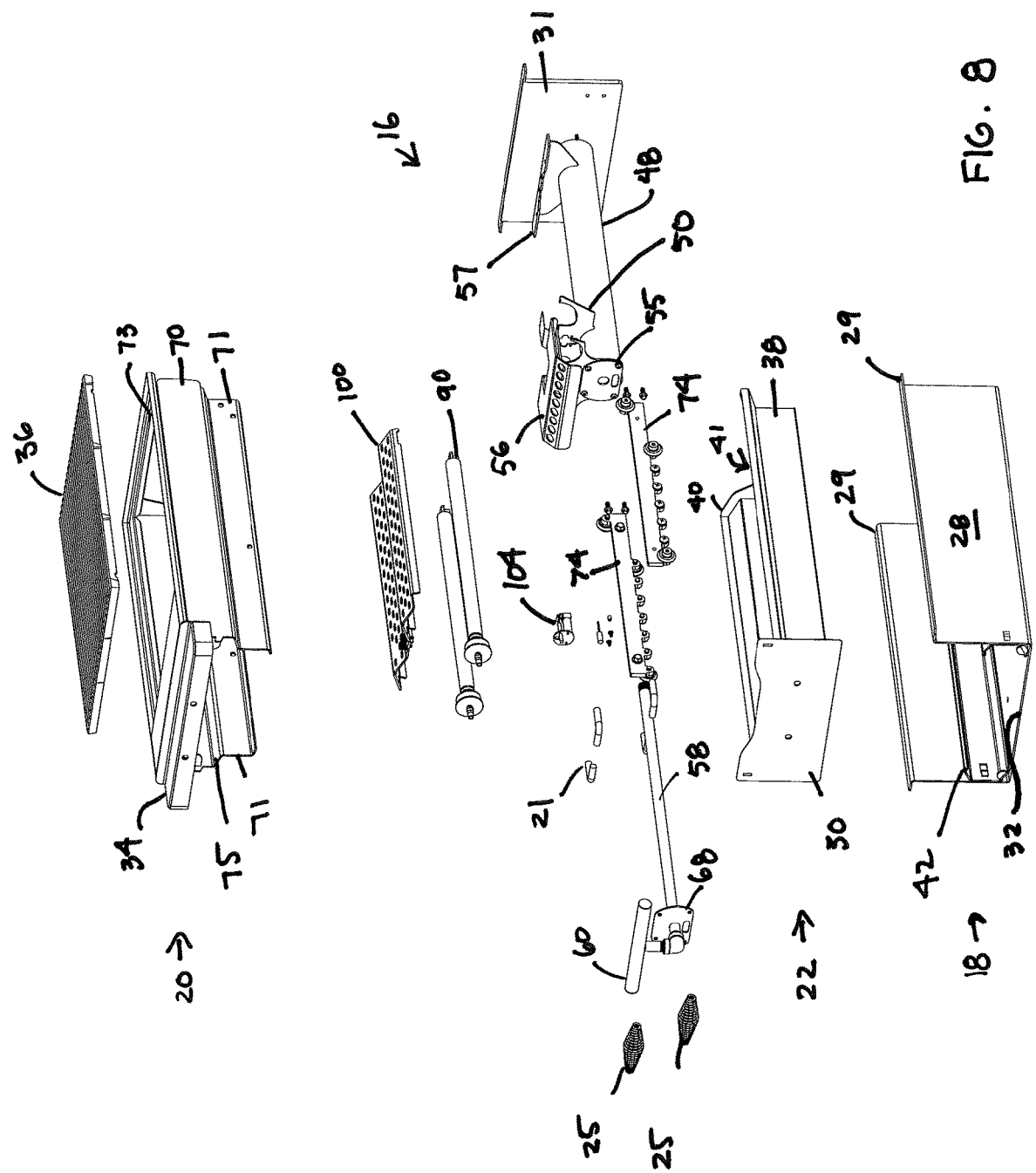
FIG. 8 is an exploded view of an embodiment of the oven broiler drawer of the present invention.

Lower drawer 22 is used to collect grease and crumbs that fall from grate 36 during the charbroiling process. Lower drawer 22 comprises an open-at-the top box defined by lower drawer front plate 30, lower drawer sides 38 and lower drawer back 40, in which the two lower drawer sides 38 are in spaced, substantially parallel relation to one another with lower drawer front plate 30 and lower drawer back 40 being attached at either end, substantially perpendicularly to lower drawer sides 38. FIGS. 3, 8. Lower drawer 22 also includes bottom 37 to which lower drawer front plate 30, lower drawer sides 38 and lower drawer back 40 are attached (e.g., welded), but this is not shown. Lower drawer back 40 comprises cut-out portion 41 which in one embodiment is generally U-shaped (or V-shaped) to accommodate or clear gas manifold assembly 16, as is discussed below, although other shapes could be used. In an embodiment, lower drawer 22 fits within housing 18 as shown in FIG. 8.

Figure 6:
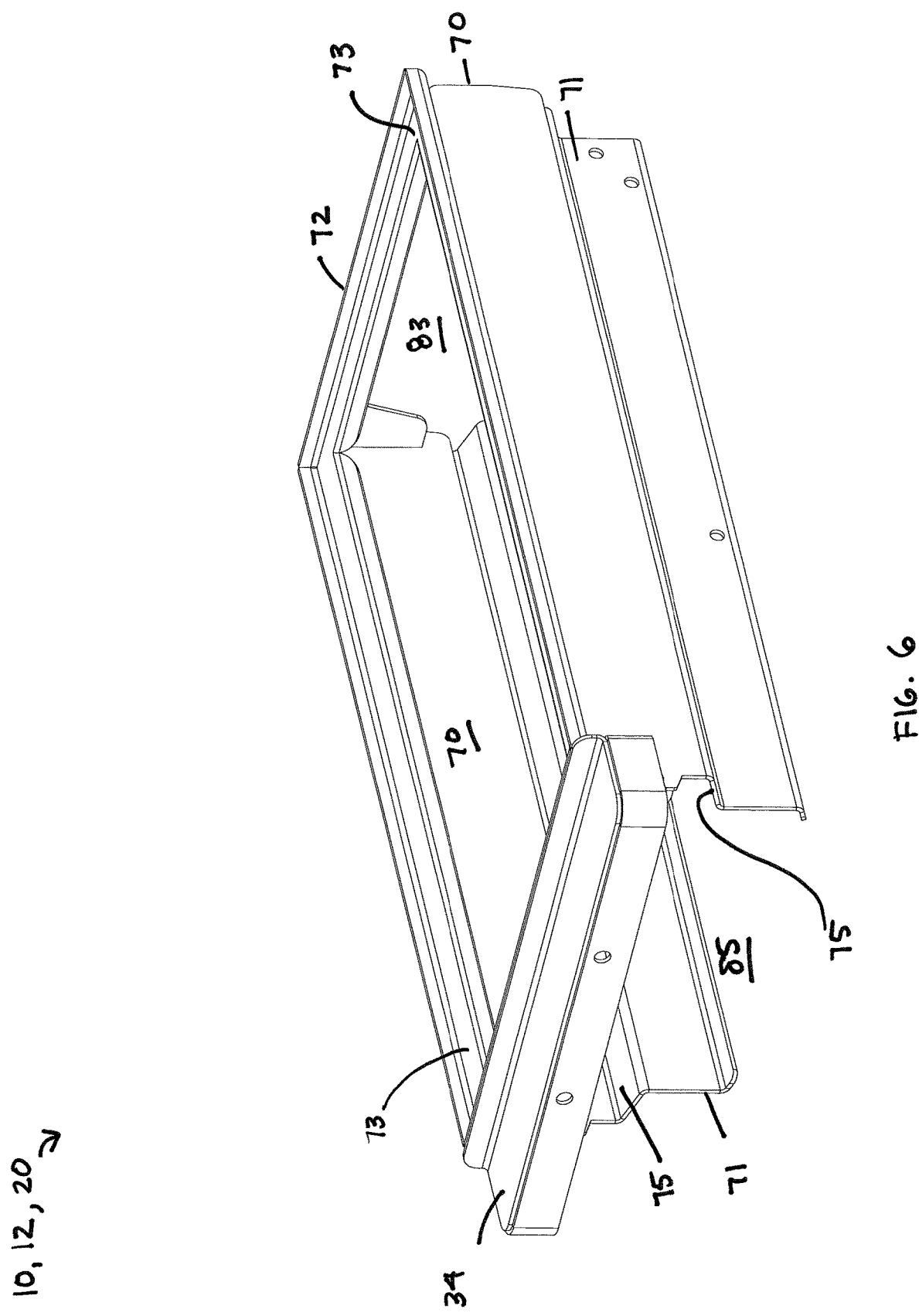
FIG. 6 is an isometric view of an upper drawer of an embodiment of the present invention.

With reference to FIGS. 1, 2, 6, 8, upper drawer 20 comprises front shelf 34, upper drawer back 72 and upper drawer sides 70 which define insert 73 that provides a support surface for grate 36 upon which cooking would take place. Upper drawer 20 comprises an open-at-the-top-and-bottom box in which upper drawer sides 70 are in spaced, substantially parallel relation to one another with front shelf 34 and upper drawer back 72 being attached at either end and substantially perpendicularly to upper drawer sides 70. Upper drawer back 72 may be described as a link tying the upper drawer sides 70 together, defining upper drawer back open portion 83; thus, the back of the upper drawer 20 is largely open but for the upper drawer back 72, as shown in FIG. 6. Front shelf 34 may also be described as a link tying upper drawer sides 70 together, defining upper drawer front open portion 85; thus, the front of upper drawer 20 is also substantially open but for front shelf 34. Upper drawer sides 70 also comprise lower portion 71. Lower portion 71 is configured to be received by housing 18. In an embodiment shown, lower portion 71 is fashioned to form flat portion 75 which is configured to rest on lip 29 of housing 18, thereby supporting upper drawer 20 within housing 18. Lower portion 71 comprises holes 69 which are used to secure caster assembly 74 of slide assembly 14.

Figure 2:
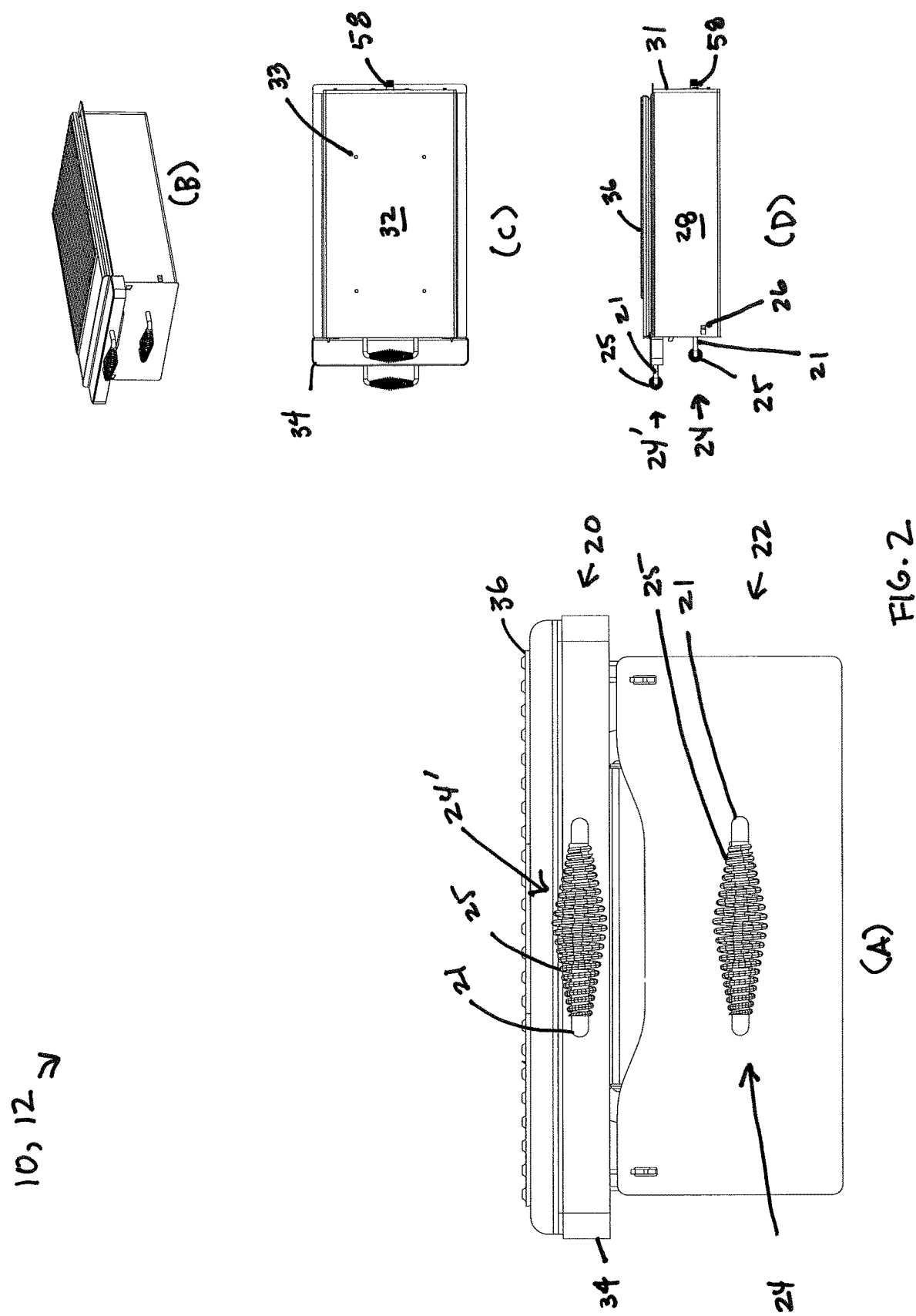
FIG. 2 contains (A) a front view, (B) an isometric view, (C) a bottom view and (D) a side view of an embodiment of the oven broiler drawer of the present invention.

As best seen in FIGS. 1, 2, handle 24, 24' is attached (e.g., welded) to both upper drawer 20 and lower drawer 22. Handle 24, 24' comprises handle base 21 (FIG. 7) and spring grip 25. In the case of upper drawer 20, handle 24' is attached to front shelf 34 in the location of holes 23'. FIG. 6. In the case of lower drawer 22, handle 24 is attached to front plate 30 in the location of holes 23. In an embodiment, handle base 21 is inserted into holes 23, 23' and welded to front shelf 34 and front plate 30 on the back side; however, other attachment configurations are possible as would be apparent to one of ordinary skill in the art after becoming familiar with the teachings of the present invention.

Figure 4:
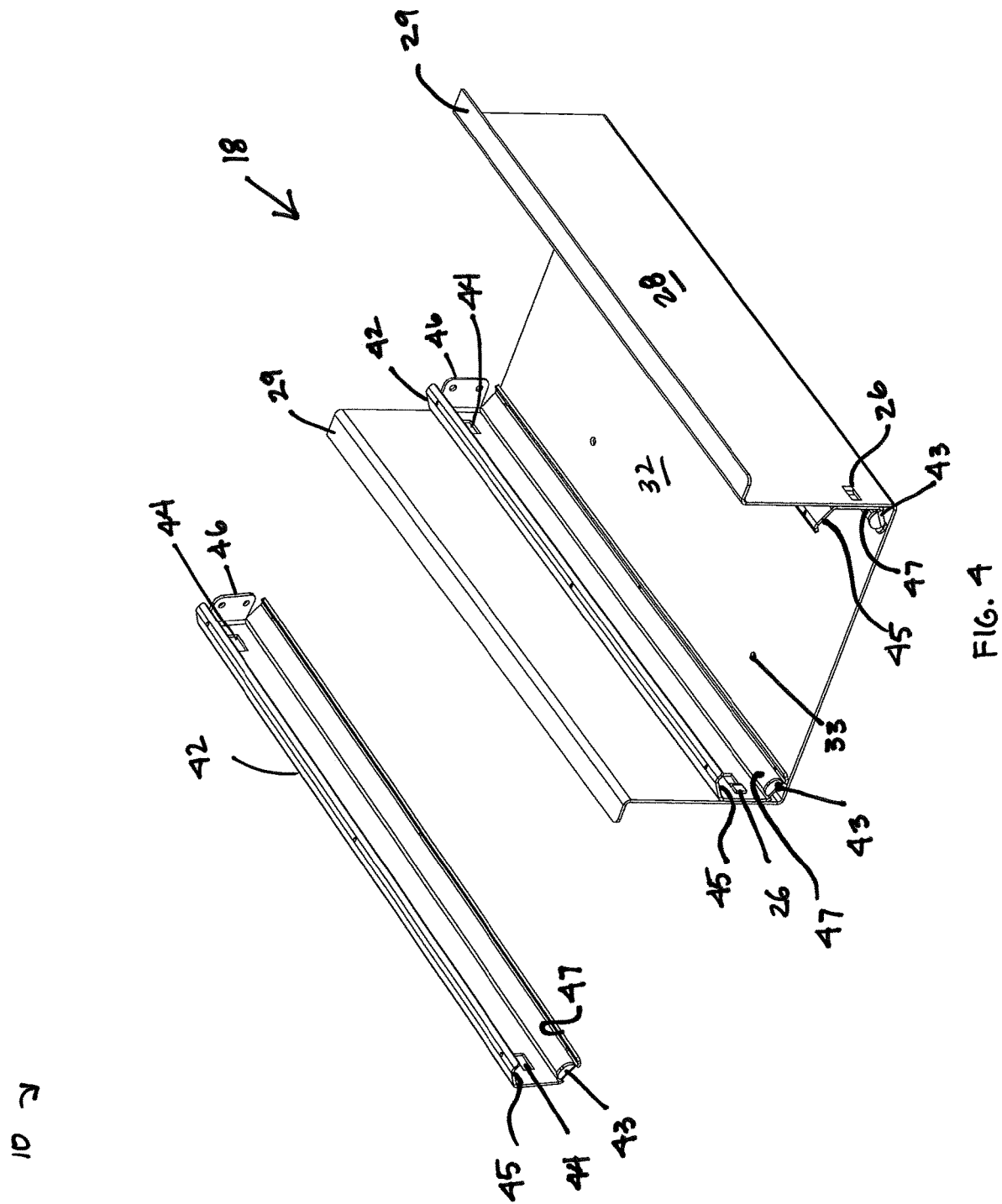
FIG. 4 are isometric views of a slide bracket and a slide bracket as installed in the housing in an embodiment of the present invention.

Housing 18 houses upper drawer 20 and lower drawer 22, as well as gas manifold assembly 16 and part of slide assembly 14. FIG. 8. As shown in FIG. 4, housing 18 comprises housing sides 28 and bottom 32. Housing sides 28 are in spaced, substantially parallel relation to one another and substantially perpendicular to bottom 32. Housing sides 28 comprise clip 26 and shelf or lip 29, which is connected to housing side 28. In the embodiment shown, clip(s) 26 are used to attach slide brackets 42 (which form part of slide assembly 14) to the interior of housing sides 28, although other attachment means are possible. Lip 29 of housing 18 is used to support upper drawer 20 when it rests within housing 18; flat portion 75 of upper drawer 20 is configured to rest on lip 29 of housing 18. In the embodiment shown, bottom 32 comprises holes 33. Holes 33 can be used for bolting or otherwise securing oven broiler drawer 10 to a base (e.g., floor 67 of a pizza oven or other ovens) for stability. See FIG. 18. As seen in FIG. 8, housing 18 further comprises housing back 31, which is used to support gas manifold assembly 16. Housing back 31 is attached (e.g., welded) to housing sides 28 and bottom 32 in perpendicular relation to those components. As shown in FIGS. 4 and 8, housing 18 is substantially open at the top and configured to receive lower drawer 22, gas manifold assembly 16, and upper drawer 20, including grate 36. Thus, housing 18 may be described as a generally U-shaped box open at the top and in the front.

In an embodiment, lower drawer 22, upper drawer 20 and housing 18 are each fashioned from a single piece of stainless steel, cut and bent to form the final shape of each component with the connections and attachments being made by welding, unless otherwise indicated, but the invention should not be viewed as being limited in that respect. In another embodiment, each element comprising lower drawer 22, upper drawer 20 and housing 18 could be fashioned individually and welded together. All parts are stainless steel, unless otherwise indicated. In an embodiment, 304 stainless steel was used; however, 316 stainless steel could also be used, along with any other suitable material that is rust-resistant and could withstand the very high heat of burners 90. In one embodiment, grate 36 is made out of cast-iron, but other materials suitable for high heat could also be used.

As best seen in FIG. 8, housing 18 comprises the support base for oven broiler drawer 10, into which is inserted lower drawer 22, gas manifold assembly 16, and upper drawer 20, including grate 36. In an embodiment shown, upper drawer 20 and lower drawer 22 are inserted into housing 18 in a nesting, cooperative arrangement. Components of slide assembly 14 are variously attached to housing 18 and upper drawer 20 in cooperative fashion to permit upper drawer 20 to be extended via operation of slide assembly 14 when a user pulls on handle 24' (or retracted via operation of slide assembly 14 when the user pushes on handle 24'). In an embodiment, due to the nesting design of upper drawer 20 and lower drawer 22, extending upper drawer 20 will cause lower drawer 22 to follow along and be pulled out as well in trailing fashion.

Slide assembly 14 and its operation will now be discussed with reference to the drawings. FIGS. 4, 5, 8-11. Slide assembly 14 comprises slide bracket 42 and caster assembly 74 which is configured to operate cooperatively with slide bracket 42 to allow upper drawer 20 and lower drawer 22 to be extended or retracted, separately or together.

Figure 5:
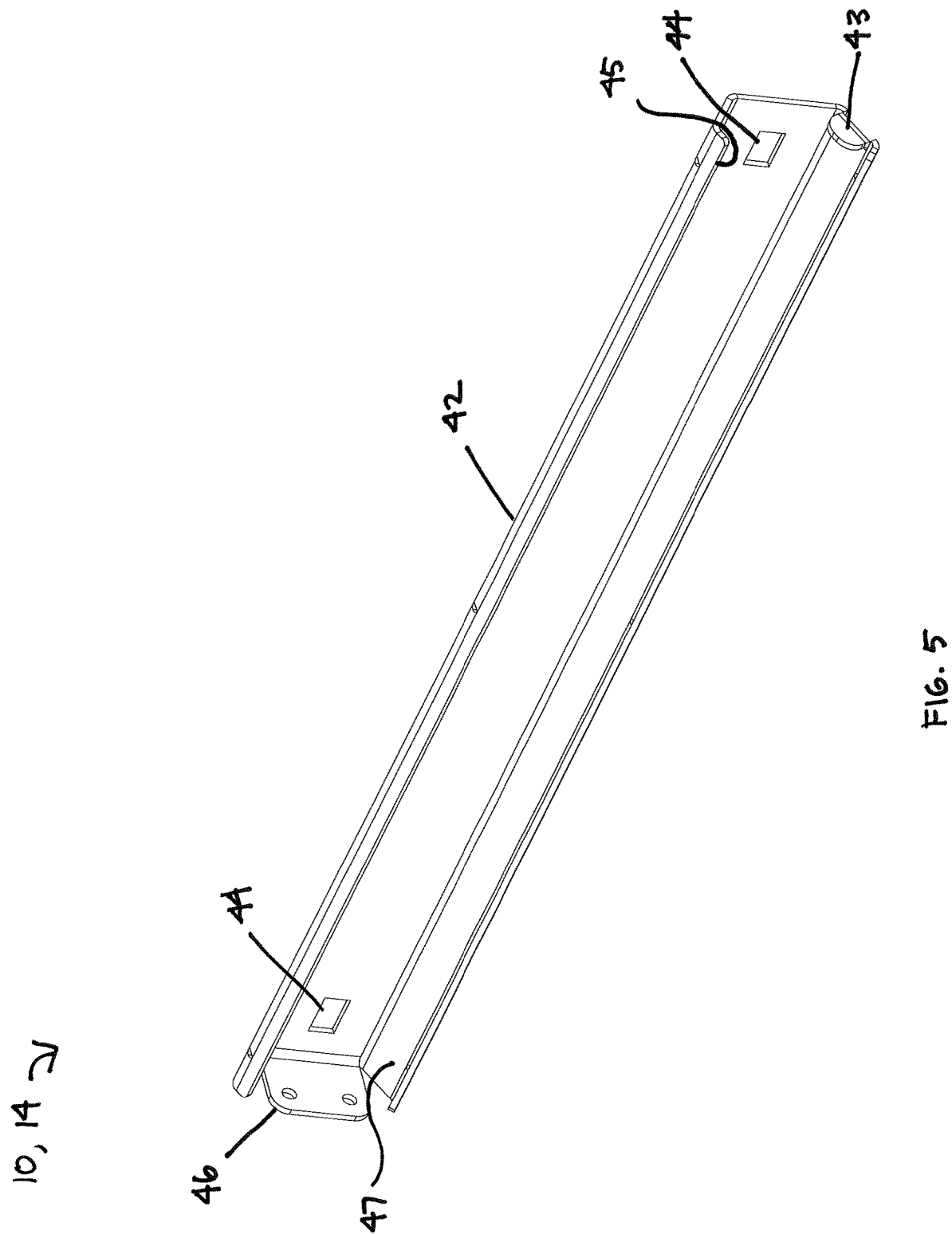
FIG. 5 is a detailed view of a slide bracket.
Figure 10:
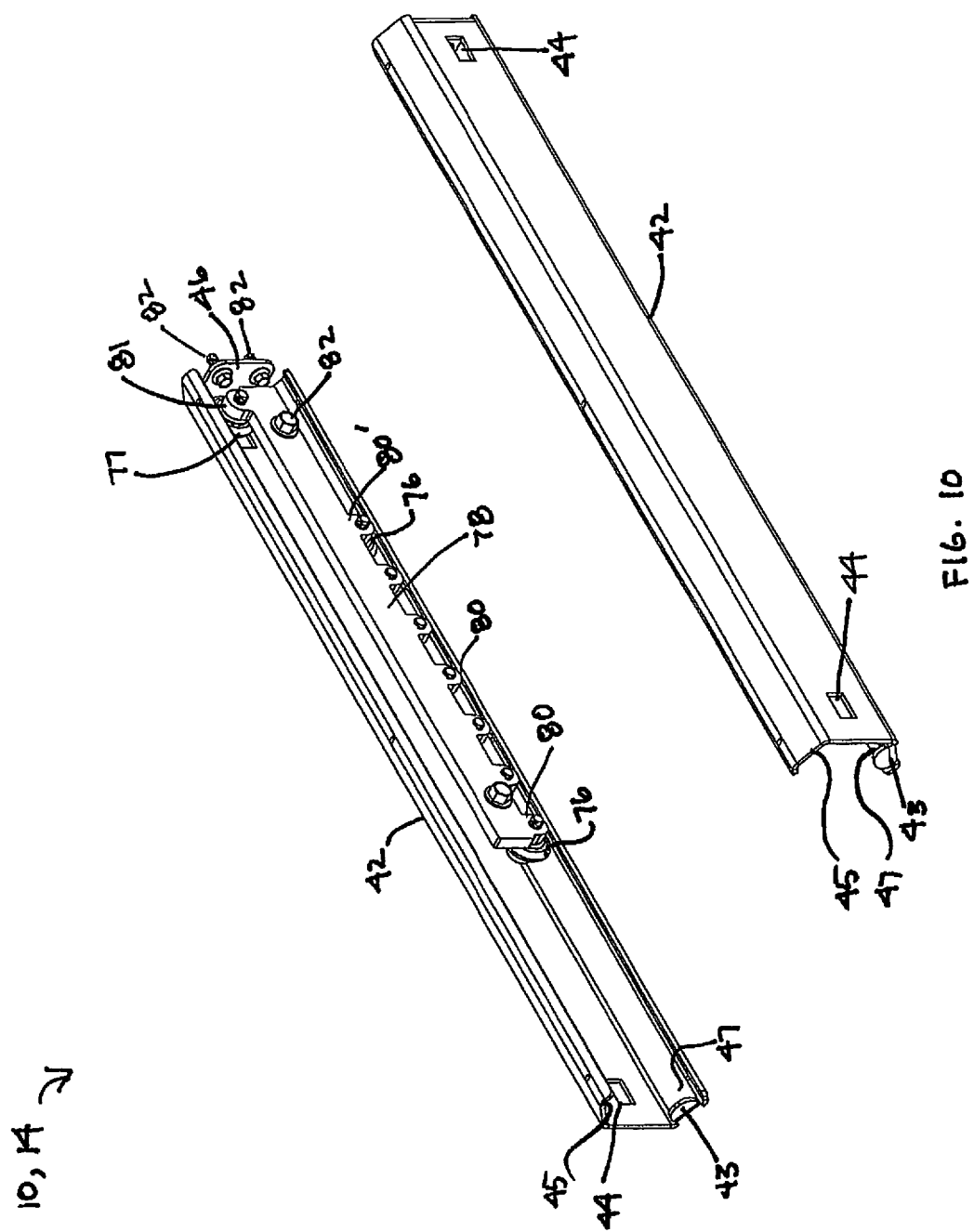
FIG. 10 is an isometric view of an embodiment of a slide assembly of the present invention.

Slide brackets 42 comprise upper track 45, lower track 47, as well as flange 46, slide stop 43 and holes 44; slide brackets 42 are configured to receive caster assembly 74. See FIG. 10. As shown in FIGS. 5 and 10, slide bracket 42 forms a generally C-shaped channel with upper track 45 and lower track 47 being oriented generally parallel to one another. Flange 46 is attached in a general perpendicular orientation to upper track 45 and lower track 47. Slide stop 43 is generally perpendicular to lower track 47. In one embodiment, slide bracket 42 is fashioned from a single sheet of stainless steel, cut and bent to the desired shape as shown in in FIG. 5, although the invention should not be viewed as being limited in this respect. In an embodiment shown in in FIG. 4, slide brackets 42 are attached to the interior of housing sides 28 by inserting clips 26 of housing sides 28 into holes 44 of slide bracket 42; however, other attachment means could be used. Flange 46 is configured to be bolted to housing back 31 using bolts 82 inserted in holes 61.

Caster assembly 74 in turn is mounted to the exterior of upper drawer sides 70 and configured to engage with slide bracket 42 in cooperative fashion to permit upper drawer 20 and lower drawer 22 to be pulled out or pushed in (e.g., extended or retracted). Caster assembly 74 comprises caster 76, 76', upper caster 77 and caster support member 78. Caster 76 and upper caster 77 are both operably connected to caster support member 78, which further comprises a plurality of caster mounting locations 80, screws 84 and bolt 82. FIGS. 8-11.

Figure 9:
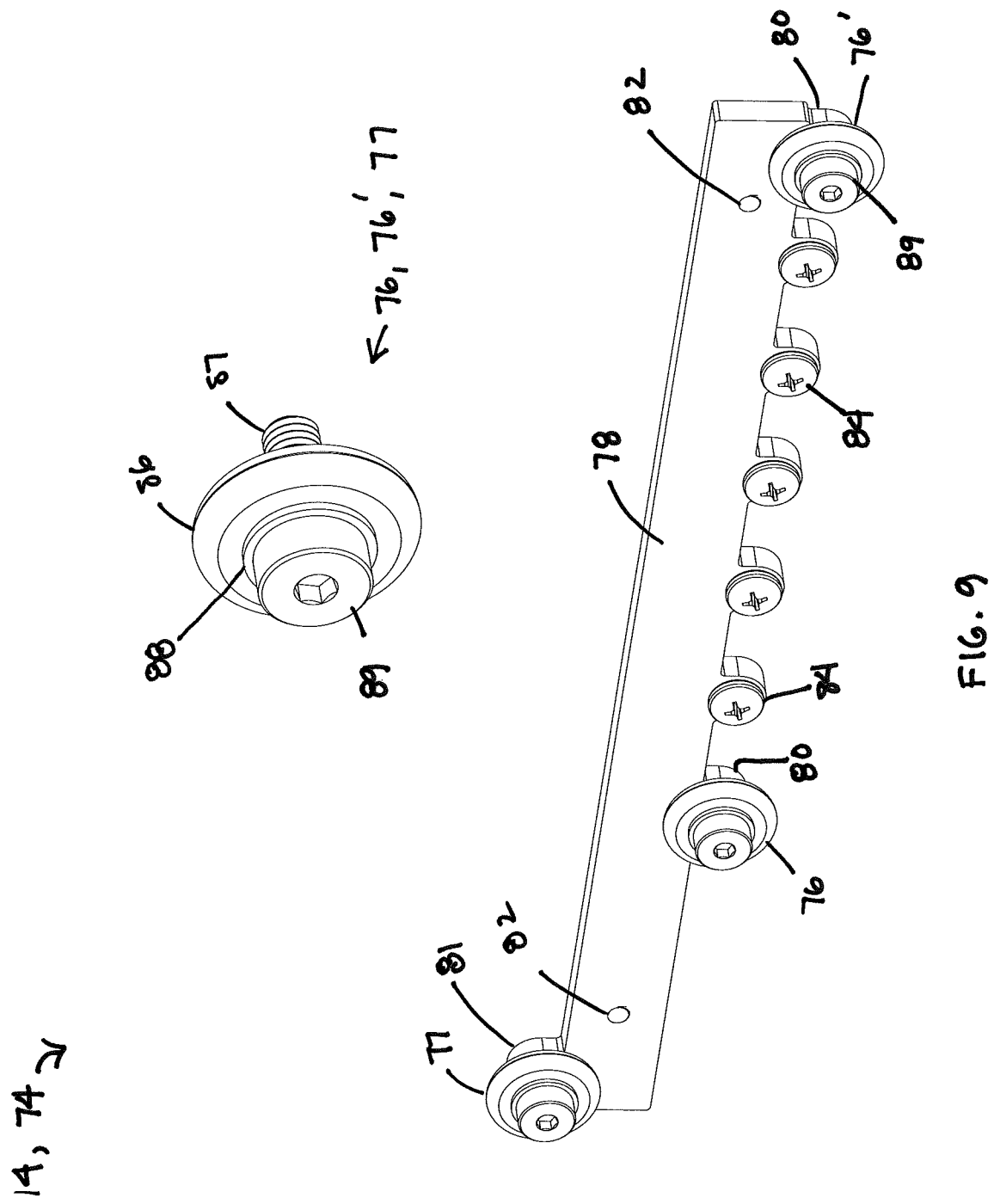
FIG. 9 is an isometric view of a caster assembly of an embodiment of the present invention, as well as a caster.
Figure 11:
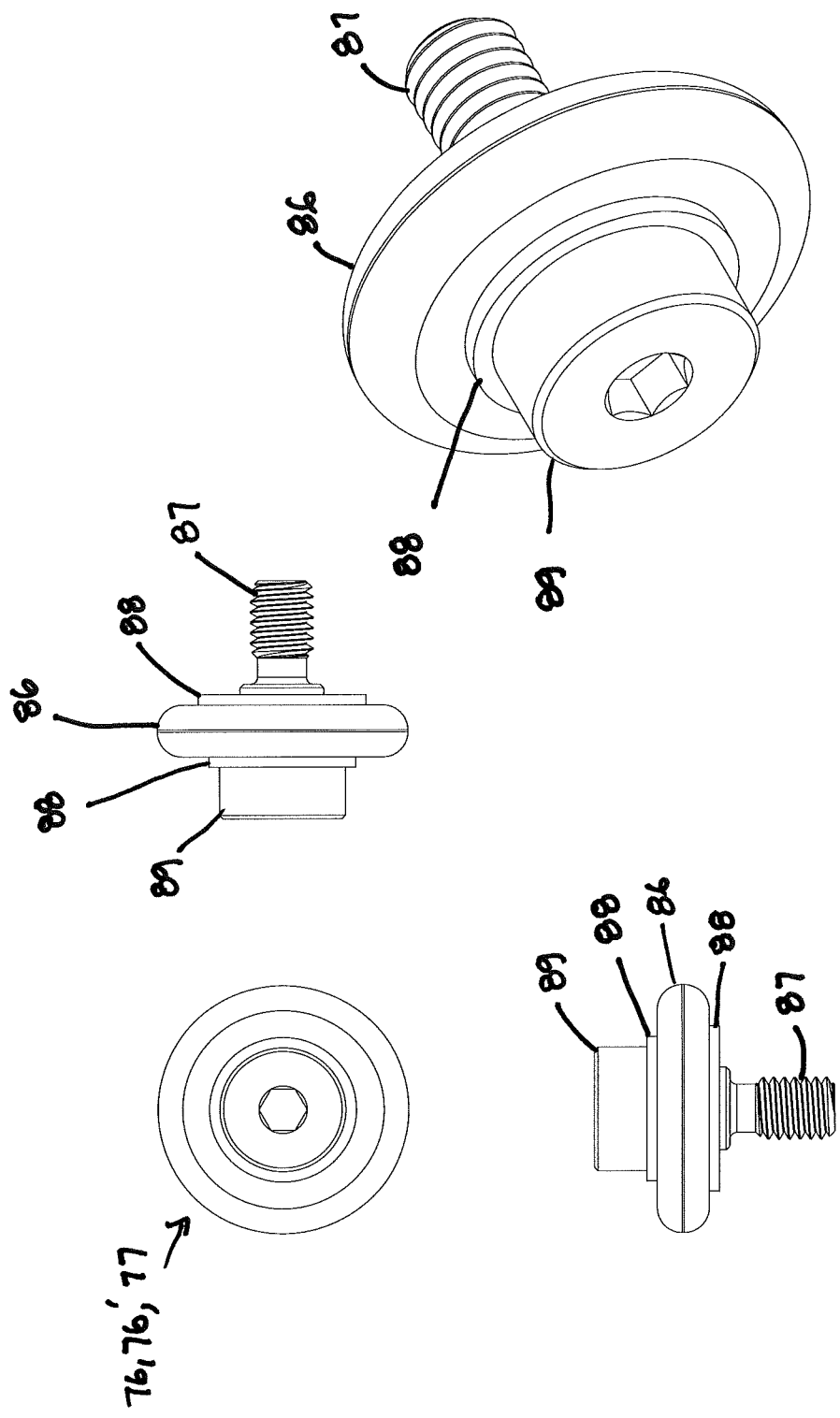
FIG. 11 shows multiple views of a caster.

As best seen in FIGS. 9-11, caster 76 and upper caster 77 comprise wheel 86, washer 88, shoulder screw 89 and threaded portion 87, which are assembled in the manner shown. In an embodiment shown, caster 76 and upper caster 77 are fashioned from 304 stainless steel with bronze bushings to hold the heat without sparking, as well as the weight of the extremely heavy drawer assembly 12, which may weigh between about 100 and about 200 pounds. The bronze bushings may act as a wear surface for the stainless steel wheels 86. In an embodiment shown, the bronze used for the bushings was oil impregnated, self-lubricating bronze. Threaded portion 87 is used to attach caster 76,76' and upper caster 77 to caster support member 78, secured with shoulder screw 89. Upper caster 77 is attached at mounting location 81; caster 76, 76' is secured at mounting locations 80, as explained below.

In an embodiment shown in FIGS. 9-11, caster 76 is attached to caster support member 78 in the mounting location 80' closest to housing back 31. Caster 76' can be attached at any of the other mounting locations 80 to control the degree to which the caster support member 78 may be extended in slide bracket 42; when caster 76' hits slide stop 43, further movement of the caster assembly 74 is curtailed. Thus, the closer caster 76' is moved toward housing back 31, the more the caster assembly 74 can be extended. This adjustable feature of slide assembly 14 of the present invention is particularly advantageous. The adjustable configuration can be employed to limit extension of slide assembly 14 (and thereby drawer assembly 12) based on oven application so that slide assembly 14 (and drawer assembly 12) cannot be extended past the limit of the exhaust hood associated with the oven, for example. In addition, slide assembly 14 also can be configured to allow for full extension of slide assembly 14 (and drawer assembly 12).

The manner in which caster assembly 74 may be extended within slide bracket 42 is shown in FIG. 11. Upper caster 77 supported by caster support member 78 is seated within and configured to roll along upper track 45 of slide bracket 42. In the embodiment shown, caster 76 is attached to caster support member 78 in the mounting location 80' closest to housing back 31, while caster 76' is mounted in mounting location 80 furthest from the housing back 31. Casters 76, 76' supported by caster support member 78 are seated within and configured to roll along lower track 47 until caster 76' runs into slide stop 43.

Caster support member 78 is configured to be mounted to the exterior of lower side 71 of upper drawer 20 in the location of holes 69 using bolts 82; however, the invention should not be viewed as being limited in this respect, since other mounting configurations could be used. Thus, when upper drawer 20 is connected to caster support member 78 in this manner and caster support member 78 is placed within slide bracket 42, pulling on handle 24' of upper drawer 20 will cause upper drawer 20 to be extended by virtue of the action of casters 76, 76', 77 and caster support member 78 in cooperation with slide bracket 42. In addition, in an embodiment, due to the nesting design of upper drawer 20 and lower drawer 22, extending upper drawer 20 will cause lower drawer 22 to follow along and be pulled out as well in trailing fashion. Lower drawer 22, being the crumb drawer or grease tray, can be pulled out independently of upper drawer 20.

Figure 18:
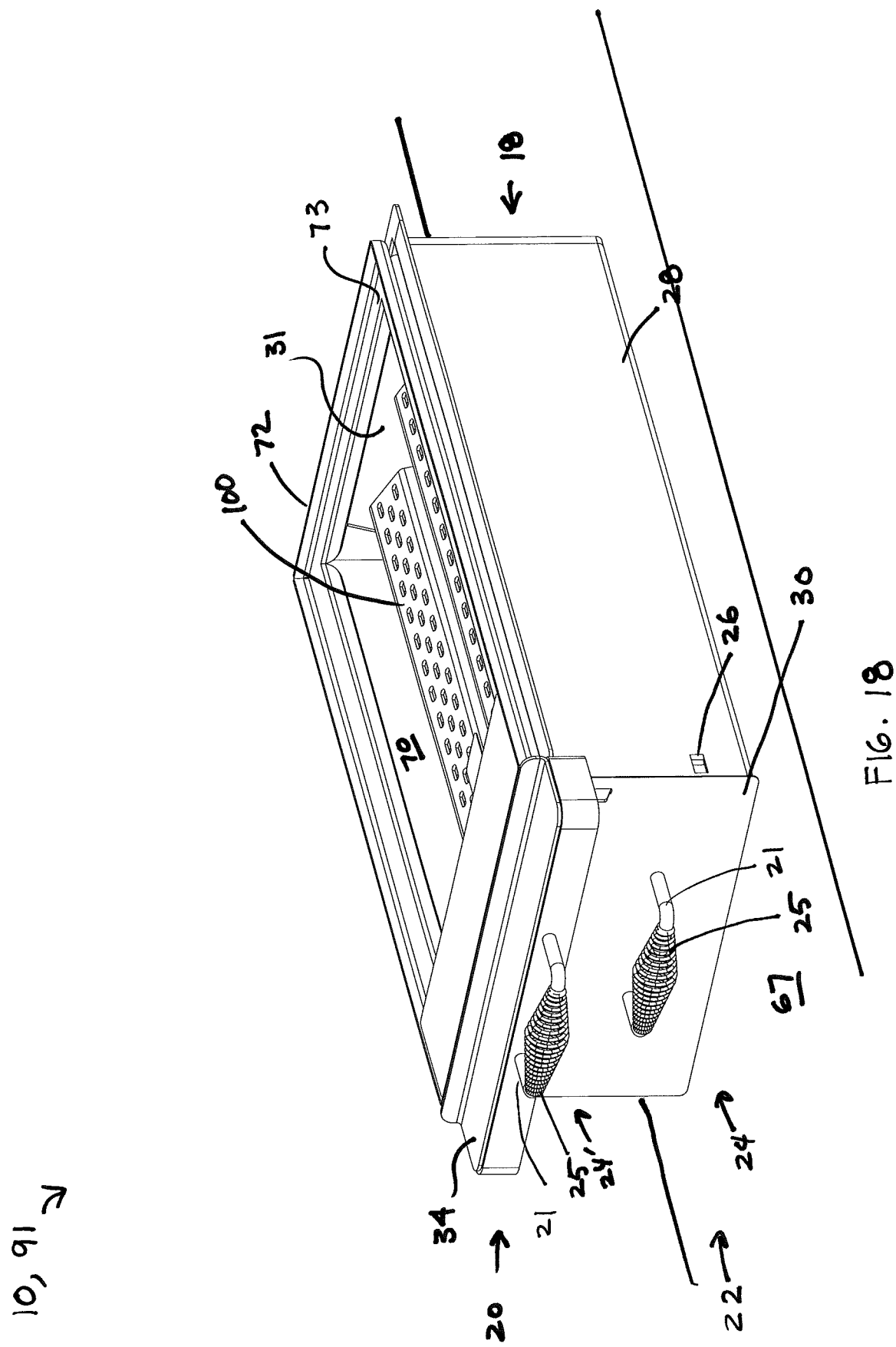
FIG. 18 is an isometric view of an embodiment of the oven broiler drawer of the present invention showing the radiant deflector as installed in the drawer assembly and housing.

As discussed above, upper drawer 20 and lower drawer 22 are configured with gas manifold assembly 16 in mind. FIGS. 8, 18. Specifically, upper drawer 20 and lower drawer 22 are substantially open in the back so that upper drawer 20 and lower drawer 22 can slide in and out via slide assembly 14 without disturbing gas manifold assembly 16, leaving gas manifold assembly 16 in place even when burner assembly 91 is on. Unlike other charbroilers or ovens, gas manifold assembly 16 is positioned in the center of oven broiler drawer 10, as is explained more fully below, which allows the upper drawer 20 and lower drawer 22 to be moved without impacting gas manifold assembly 16.

Gas manifold assembly 16 will now be described with reference to the drawings. FIGS. 12-20. Gas manifold assembly 16 comprises support assembly 49, gas supply assembly 51 and burner assembly 91.

Figure 12:
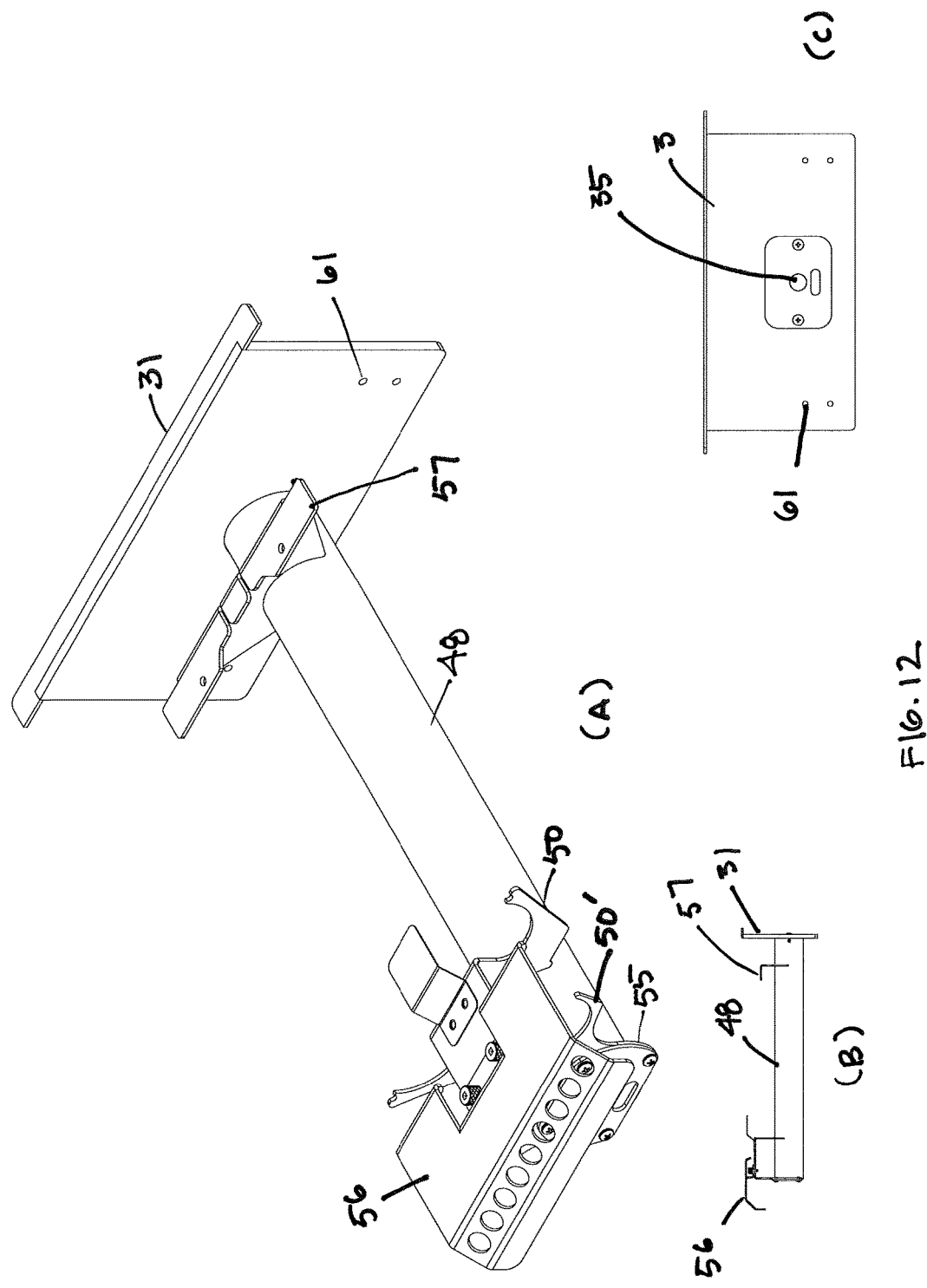
FIG. 12 is (A) an isometric view of a support assembly of a gas manifold assembly, (B) a side cross-section of a support assembly of a gas manifold assembly, and (C) a front view of a housing back showing a support assembly of a gas manifold assembly as installed in an embodiment of the present invention.

As best seen in FIG. 12, support assembly 49 comprises support beam 48, burner brackets 50, orifice support bracket 56, manifold support plate 55 and shelf 57. Support beam 48 supports the gas supply assembly 51 and the burner assembly 91 in cantilever fashion. Support beam 48 is inserted into and secured against housing back 31, which may be considered a securing plate. In an embodiment, support beam 48 is welded to the back side of housing back 31, which may serve as support for securing support beam 48. When support beam 48 is so welded, housing back 31 is welded (e.g., attached) to housing 18 and the bottom 32 of housing 18 is bolted to a base surface, support beam 48 is cantilevered from housing back 31 and supports gas supply assembly 56 and burner assembly 91. In another embodiment, housing back 31 could be independently welded or secured to a base, such as oven floor 6, without requiring housing back 31 to be otherwise secured to housing sides 28 or bottom 32. Thus, while gas manifold assembly 16 is described herein as part of oven broiler drawer 10 of the present invention, it need not be limited in that respect and could be used in other types of ovens, grills and cooking or heating equipment.

As best seen in FIG. 8, burner brackets 50 support pipe burners 90; support beam 48 holds gas pipe 58, while orifice support bracket is connected to distribution pipe 60 via pipe fittings 62 and manifold attachment plate 68 is connected to manifold support plate 55. Shelf 57 and the top of orifice support bracket 56 hold radiant deflectors 100.

Figure 13:
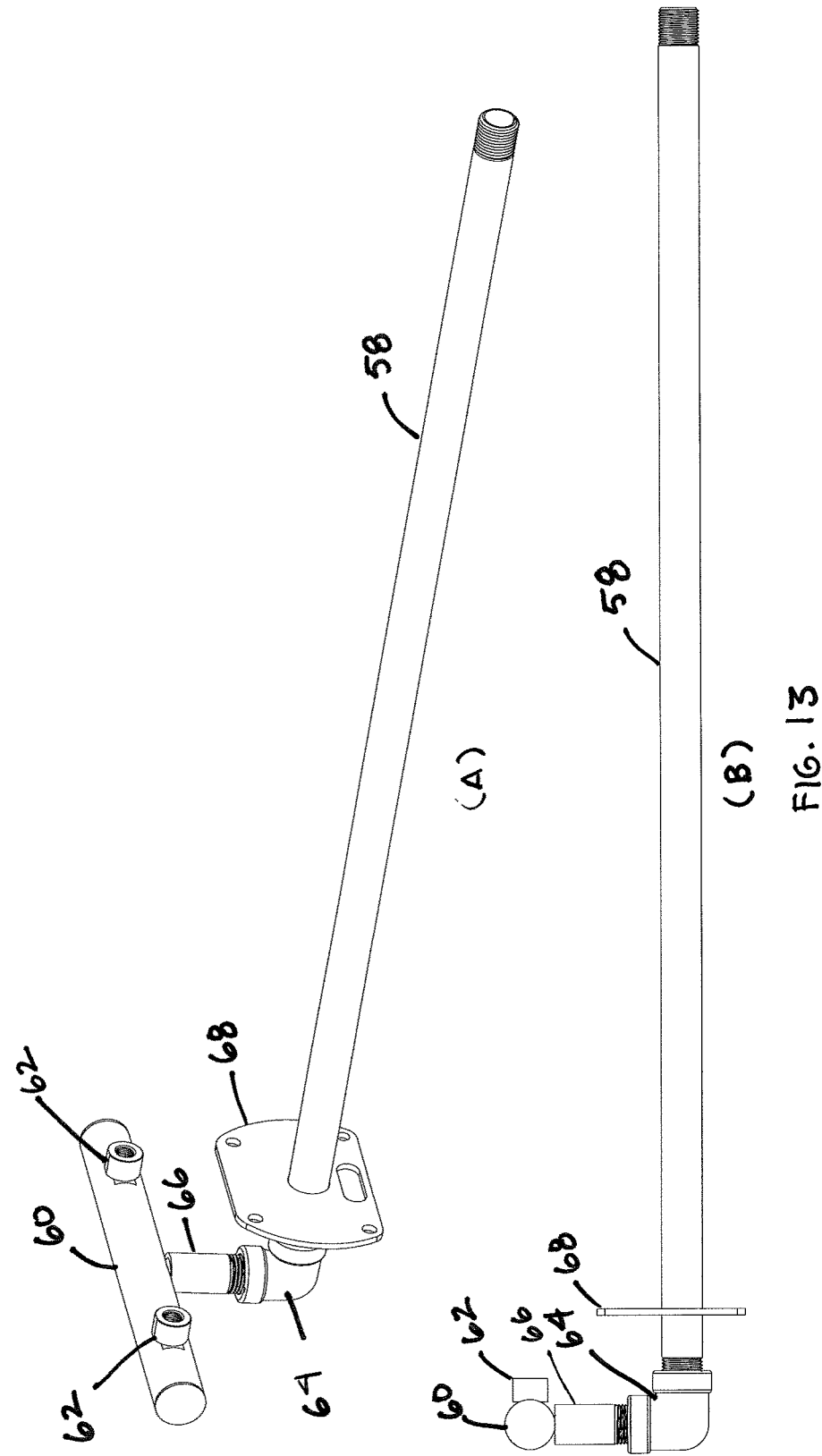
FIG. 13 is (A) an isometric view and (B) a side view of a gas supply assembly in an embodiment of the present invention.
Figure 14:
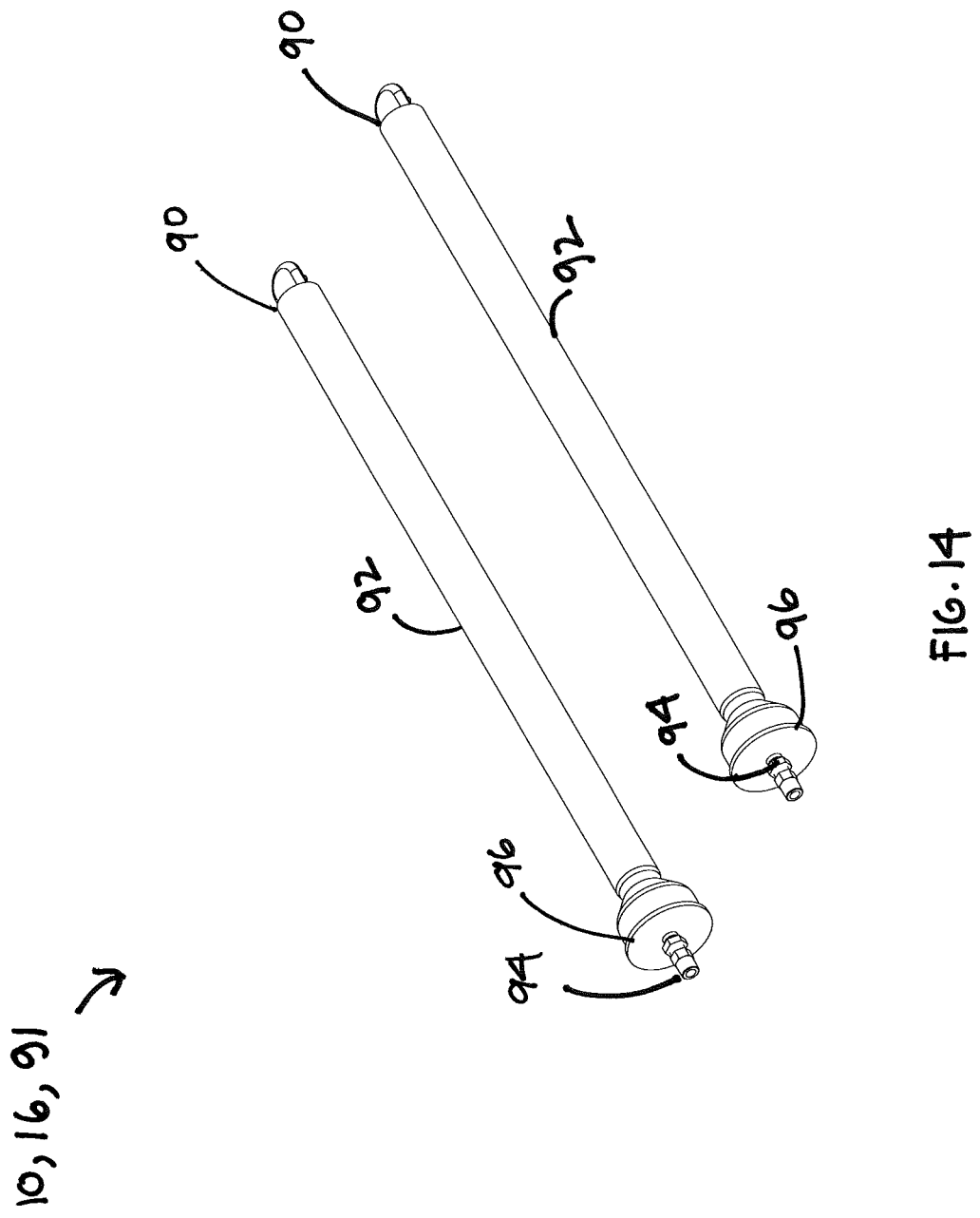
FIG. 14 is isometric view of pipe burners of an embodiment of the present invention.

With reference to FIG. 13, gas supply assembly 51 supplies the fuel source (e.g., natural gas, LPG, propane) for the oven broiler drawer 10. Gas supply assembly 51 comprises gas pipe 58 which, in an embodiment, is connected to elbow connector 64, connector 66 and distribution pipe 66, although the invention should not be viewed as being limited in this respect since other combinations of pipes and connectors could be used as would be familiar to one of ordinary skill in the art after becoming familiar with the teachings of the present invention. Supported by support beam 48, gas pipe 58 is threaded through hole 35 in housing back 31 and extends out the back as shown in FIG. 2 where it is connected to a steady supply of gas (not shown). In the front, gas pipe 58 extends through opening 65 in manifold support plate 55.

Figure 15:
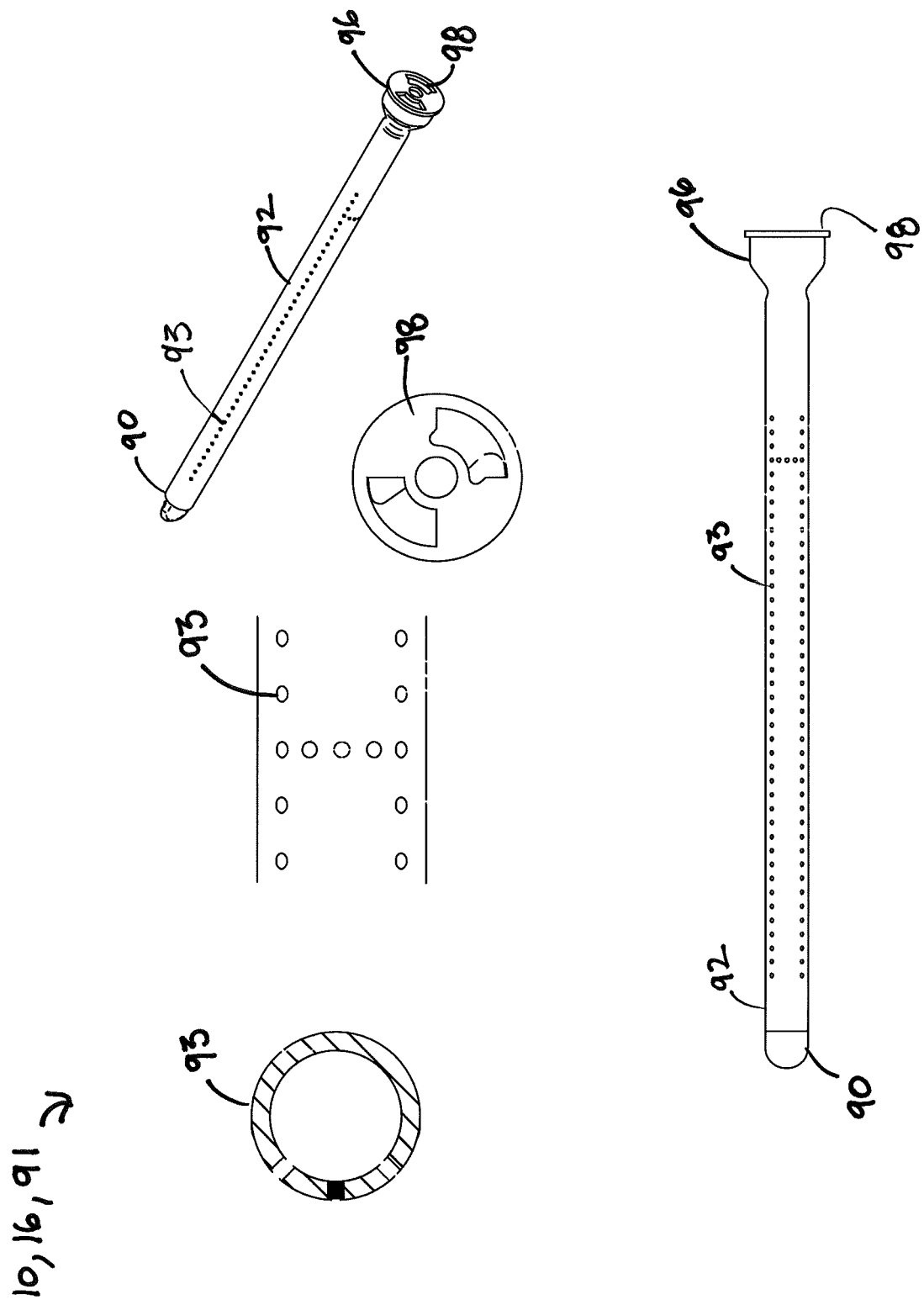
FIG. 15 contains multiple views of pipe burners of an embodiment of the present invention.
Figure 16:
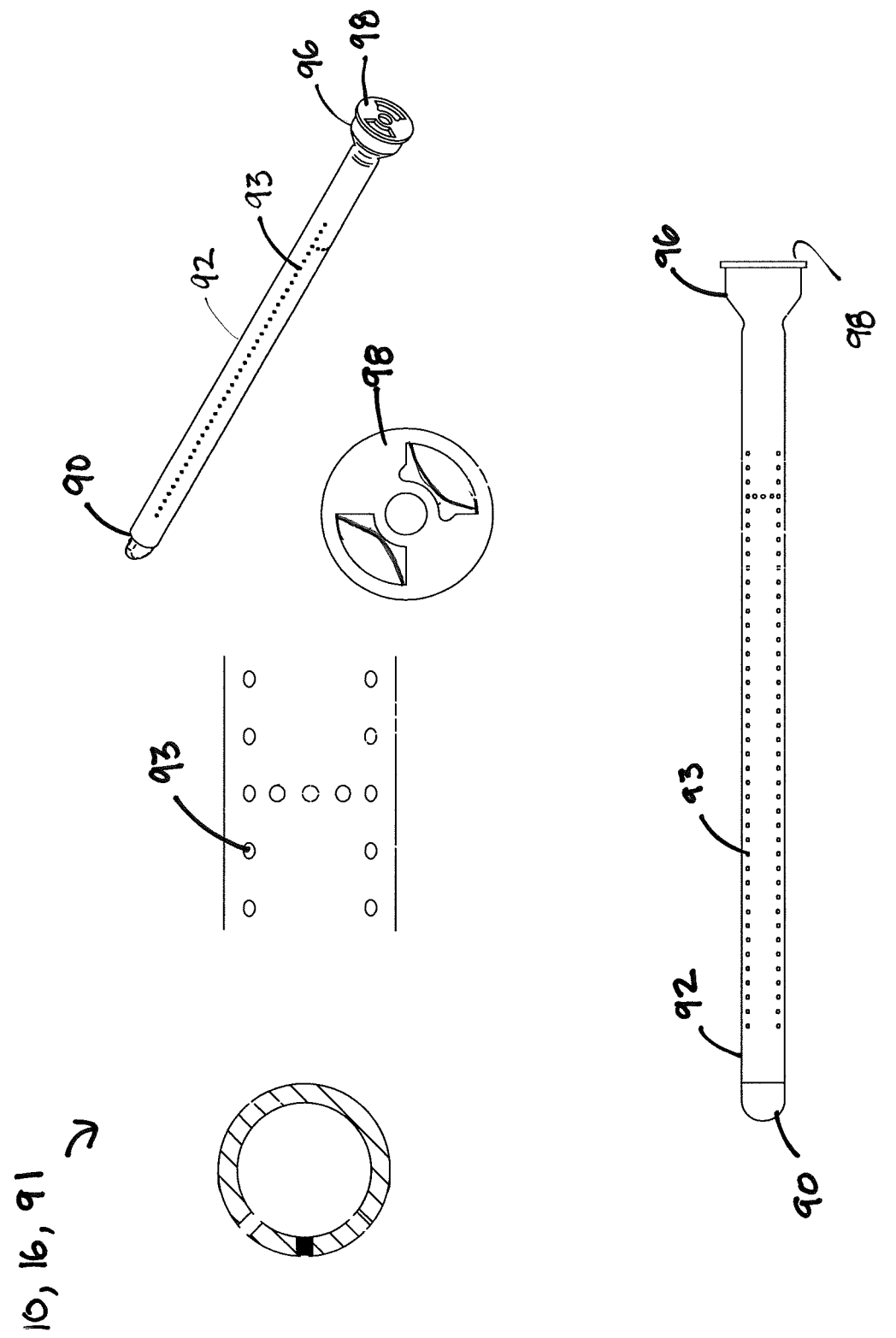
FIG. 16 contains multiple views of pipe burners of another embodiment of the present invention.
Figure 17:
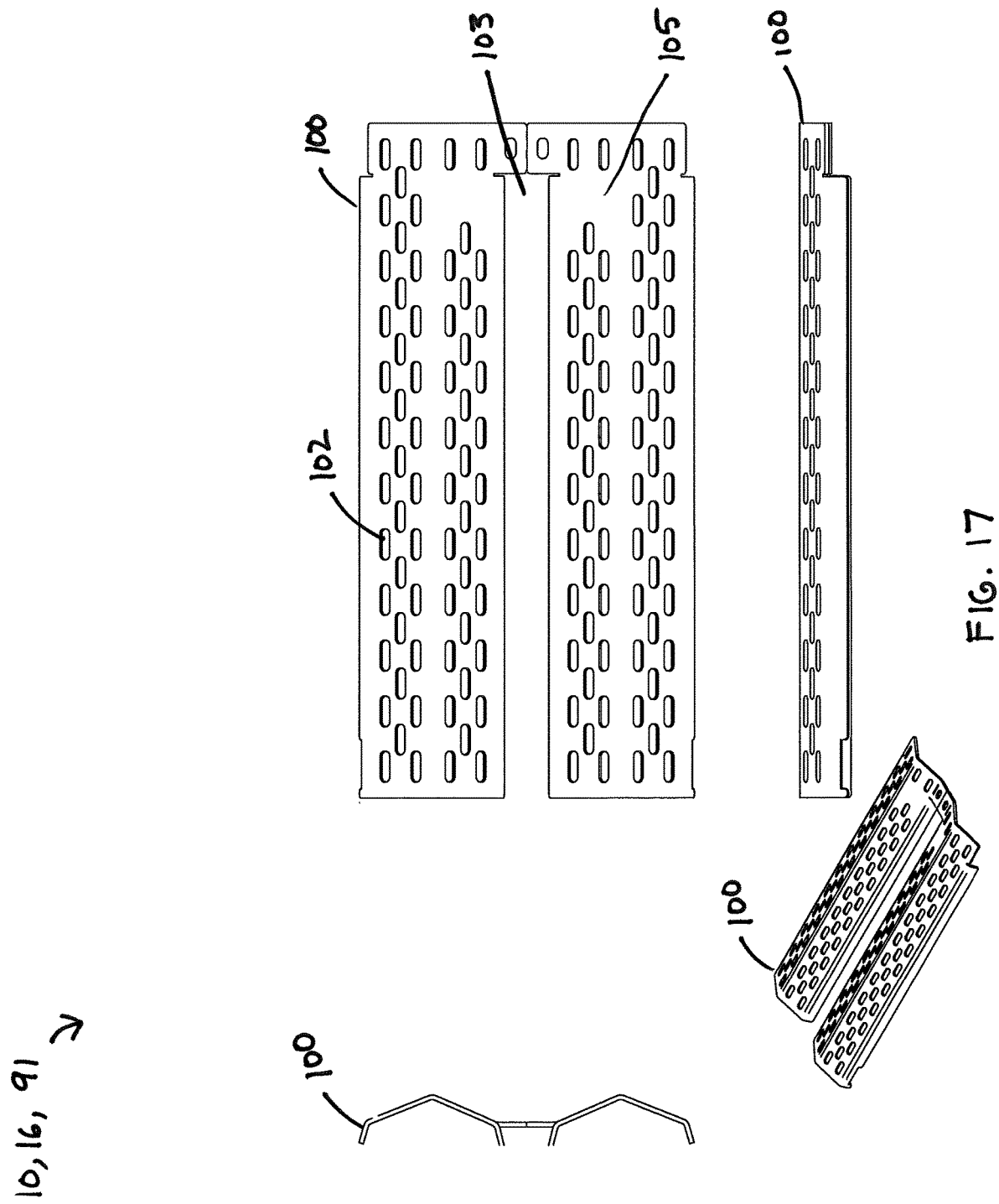
FIG. 17 shows an isometric view, plan view and end view and elevation of a radiant deflector in an embodiment of the present invention.

With reference to an embodiment shown in FIGS. 15-19, burner assembly 91 will now be described. Burner assembly 91 comprises pipe burner(s) 90, radiant deflector 100 and igniter 104 (FIG. 8). Pipe burners 90 comprise perforated pipe 92 which is connected to orifice holder 96 which holds burner orifice 94. In the embodiment shown, a plurality of pipe burners 90 are shown; however, the invention should not be viewed as being limited in this respect. With reference to FIGS. 15 and 16, holes 93 are arranged in an elongated "H" pattern, but the invention should not be viewed as being limited in this respect as other arrangements could be used. In an embodiment shown, holes 93 for propagation are not plugged, while some portion of burner holes 93 may be plugged. In addition, orifice holder 96 further comprises air shutter 98. Holes 93 permit gas to escape from perforated pipe 92 and air shutters 98 in orifice holder 96 allow burning activity to be controlled. By way of non-limiting example, as shown in FIG. 15, air shutter 98 is open 25 percent, while in FIG. 16, air shutter 98' is open 100 percent. Gas flows from distribution pipe 60 into burner orifice 94 and into perforated pipe 92 and is ignited when igniter 104 is activated. Heat is then distributed across radiant deflectors 100. Heat from the burner assembly 91 as part of oven broiler drawer 10 ranges from 24,000 British thermal unit ("btu") to about 34,000 btu.

With reference to FIGS. 18-19, in an embodiment, radiant deflector 100 is shown as a single, perforated (e.g., with perforations 102) piece of stainless steel that is bent into a "hill-and-valley" configuration with space 103 between the two halves. In an embodiment shown, perforations 102 have a staggered or offset arrangement. In addition, a small number of perforations 102 have been plugged to make a small unperforated area 105 in radiant deflector 100. Unperforated area 105 aids in obtaining an efficient air/fuel mixture for pipe burners 90. Other configurations could be used, so the invention should not be viewed as being limited in this respect. As shown in FIG. 8, radiant deflector 100 is positioned above pipe burners 90, supported by shelf 57 and orifice support bracket 56. The manner in which radiant deflector 100 is positioned within upper drawer 20 and housing 18 can be seen in FIG. 18.

In the embodiment shown in FIGS. 13-19, pipe burners 90 and radiant deflector 100 are positioned substantially parallel to support beam 48 and gas pipe 58, with radiant deflector 100 being positioned above pipe burners 90; however, other configurations are possible. The components are constructed from stainless steel of the types previously described. Pipe burners 90 are constructed from cast iron, while burner orifice 94 is made of brass.

In understanding the scope of the present invention, the term "comprising" and its derivatives, as used herein, are intended to be open ended terms that specify the presence of the stated features, elements, components, groups, and/or steps, but do not exclude the presence of other unstated features, elements, components, groups, and/or steps. The foregoing also applies to words having similar meanings such as the terms, "including," "having" and their derivatives. Any terms of degree such as "substantially," "about" and "approximate" as used herein mean a reasonable amount of deviation of the modified term such that the end result is not significantly changed. For example, these terms can be construed as including a deviation of at least ±5% of the modified term if this deviation would not negate the meaning of the word it modifies.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adapted to another embodiment. It should be noted that while the present invention is shown and described herein as it could be used in conjunction with a configuration of various components, it could be utilized with other configurations, either now known in the art or that may be developed in the future, so long as the objects and features of the invention are achieved, as would become apparent to persons having ordinary skill in the art after having become familiar with the teachings provided herein. Consequently, the present invention should not be regarded as limited to that shown and described herein. It is not necessary for all advantages to be present in a particular embodiment at the same time. Thus, the foregoing descriptions of the embodiments according to the present invention are provided for illustration only, and not for the purpose of limiting the invention as defined by the appended claims and their equivalents.

Having herein set forth preferred embodiments of the present invention, it is anticipated that suitable modifications can be made thereto which will nonetheless remain within the scope of the invention, including all changes that come within the meaning and range of equivalents. The invention shall therefore only be construed in accordance with the following claims:

What is claimed is:

1. An oven broiler drawer assembly, comprising:
    a housing, the housing comprising a bottom, a back, a first side and a second side connected to one another to form a generally U-shaped box open at the top and in the front;
    a drawer assembly, the drawer assembly comprising:
        an upper drawer, the upper drawer having no bottom and comprising two upper drawer sides in spaced parallel relation connected by an upper front portion and an upper back portion in perpendicular relation to the two upper drawer sides forming a rectangular box open at the top and bottom, the upper front portion and the two upper drawer sides defining an upper drawer front open portion and the upper back portion and the two upper drawer sides defining an upper drawer back open portion, the two upper drawer sides each comprising a lower portion shaped to be received by the housing; and a lower drawer, the lower drawer comprising two lower drawer sides in spaced parallel relation connected in perpendicular fashion to a bottom, a front plate and a back plate comprising a cut-out portion;

a slide assembly, the slide assembly comprising:
  a first slide bracket and a second slide bracket, the first slide bracket being attached to an interior of the first side of the housing and the second slide bracket being attached to an interior of the second side of the housing, each slide bracket comprising an upper track and a lower track and being configured to receive a caster assembly; and
  the caster assembly, each caster assembly being attached to an exterior of the lower portion of the two upper drawer sides, the caster assembly comprising a plurality of casters attached to a caster support member, the caster assembly being configured to operate cooperatively with the first slide bracket and the second slide bracket so that at least the upper drawer slides out of the housing when the caster assembly is engaged; and a gas manifold assembly, the gas manifold comprising a support beam, a gas supply pipe and a burner assembly, the support beam being attached in cantilever fashion to the housing back and holding the gas supply pipe within in it, the gas supply pipe extending through the housing back and being operatively associated with the burner assembly, the gas manifold assembly extending into the interior of the upper drawer and the lower drawer through upper drawer back portion and lower drawer cut-out portion to allow free movement of the drawer assembly and caster assembly when the caster assembly is engaged.

2. The oven broiler drawer assembly of claim 1, wherein the upper drawer comprises a handle connected to the upper front portion and the lower drawer comprises a handle connected to the front plate.

3. The oven broiler drawer assembly of claim 1, wherein the first side and second side of the housing each comprise an attachment clip configured to secure the first slide bracket to the interior of the first side of the housing and the second slide bracket to the interior of the second side of the housing.

4. The oven broiler drawer assembly of claim 1, wherein the first side and the second side of the housing each comprise a lip configured to receive the shaped lower portion of the two upper drawer sides.

5. The oven broiler drawer assembly of claim 1, wherein the caster assembly being configured to operate cooperatively with the first slide bracket and the second slide bracket comprises the upper drawer and the lower drawer being configured to slide out of the housing when the caster assembly is engaged.

6. The oven broiler drawer assembly of claim 5, wherein the upper drawer and the lower drawer being configured to slide out of the housing comprises the upper drawer being configured to slide out of the housing first when the caster assembly is engaged, with the lower drawer being configured to slide out trailing the upper drawer.

7. The oven broiler drawer assembly of claim 1, further comprising a cooking surface configured to be received by the open top of the housing.

8. The oven broiler drawer assembly of claim 7, wherein the cooking surface comprises a grate.

9. The oven broiler drawer assembly of claim 1, wherein the burner assembly comprises at least one pipe burner and one radiant deflector, the radiant deflector being positioned above the at least one pipe burner.

10. A charbroiler drawer assembly, comprising:
a housing, the housing comprising a bottom, two sides and a back, the sides being in spaced parallel relation to one another and perpendicular to the bottom, the back being attached to the bottom and the sides in perpendicular fashion, the housing being substantially open at the top;
a drawer assembly without a bottom, the drawer assembly comprising a cooking surface and two sides in spaced parallel relation linked by a back member defining a substantially open portion, the sides being shaped to be received by the housing and to support the cooking surface on top;
a slide assembly, the slide assembly comprising two slide brackets and a caster assembly, the caster assembly comprising a plurality of casters attached to a caster support members, each slide bracket comprising an upper track and a lower track configured to receive at least one caster assembly, each slide bracket being attached to an interior of one housing side and each caster assembly being attached to an exterior of each drawer side configured so that the drawer assembly slides out of the housing when the caster assembly is engaged; and
a gas manifold assembly, the gas manifold comprising a support beam, a gas supply pipe and a burner assembly, the support beam being attached in cantilever fashion to the housing back and holding the gas supply pipe within in it, the gas supply pipe extending through the housing back and being operatively associated with the burner assembly, the gas manifold assembly being positioned to allow free movement of the drawer assembly and caster assembly when the caster assembly is engaged.

11. A charbroiler drawer assembly, comprising:
a housing, the housing comprising a bottom, two sides and a back, the sides being in spaced parallel relation to one another and perpendicular to the bottom, the back being attached to the bottom and the sides in perpendicular fashion;
a drawer assembly without a bottom, the drawer assembly comprising a cooking surface and two sides in spaced parallel relation linked by a back member defining a substantially open portion, the sides being shaped to be received by the housing and to support the cooking surface on top;
a slide assembly, the slide assembly comprising two slide brackets and a caster assembly, the caster assembly comprising a plurality of casters attached to a caster support members, each slide bracket comprising an upper track and a lower track configured to receive at least one caster assembly, each slide bracket being attached to an interior of one housing side and each caster assembly being attached to an exterior of each drawer side configured so that the drawer assembly slides out of the housing when the caster assembly is engaged; and
a gas manifold assembly, the gas manifold comprising a support beam, a gas supply pipe and a burner assembly, the support beam extending through the substantially open portion of the drawer assembly back member and being attached in cantilever fashion to the housing back and holding the gas supply pipe within in it, the gas supply pipe extending through the housing back and being operatively associated with the burner assembly, the gas manifold assembly being positioned to allow free movement of the drawer assembly and caster assembly when the caster assembly is engaged.

12. The charbroiler drawer assembly of claim 10, wherein the drawer assembly comprises an upper drawer and a lower drawer, the lower drawer comprising a box with an open top and a back with a cut-out portion configured to clear the gas manifold assembly during movement of the drawer assembly and caster assembly when the caster assembly is engaged, and the upper drawer comprising a cooking surface, two sides and a front member, the two sides being in spaced parallel relation linked by a back member defining a substantially open portion configured to clear the gas manifold assembly during movement of the drawer assembly and caster assembly, the sides being shaped to be received by the housing and to support the cooking surface on top, and the front member defining a substantially open front portion.

13. The charbroiler drawer assembly of claim 10, wherein the caster assembly is attached to the exterior of the upper drawer sides.

14. The charbroiler drawer assembly of claim 10, wherein the cooking surface comprises a grate.

\* \* \* \* \*